United States Patent
Kim et al.

(10) Patent No.: US 10,595,285 B2
(45) Date of Patent: *Mar. 17, 2020

(54) APPARATUS AND METHOD FOR TRANSMITTING A POWER HEADROOM REPORT IN A WIRELESS COMMUNICATION SYSTEM SUPPORTING MULTI-CARRIERS

(71) Applicant: LG ELECTRONICS INC., Seoul (KR)

(72) Inventors: Dongcheol Kim, Gyeonggi-do (KR); Hangyu Cho, Gyeonggi-do (KR); Yeonghyeon Kwon, Gyeonggi-do (KR); Jaehoon Chung, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/046,062

(22) Filed: Jul. 26, 2018

(65) Prior Publication Data

US 2018/0332543 A1 Nov. 15, 2018

Related U.S. Application Data

(63) Continuation of application No. 15/203,611, filed on Jul. 6, 2016, now Pat. No. 10,057,862, which is a (Continued)

(30) Foreign Application Priority Data

Mar. 25, 2011 (KR) .................. 10-2011-0027047

(51) Int. Cl.
*H04W 72/04* (2009.01)
*H04W 52/36* (2009.01)
(Continued)

(52) U.S. Cl.
CPC ............ *H04W 52/365* (2013.01); *H04L 5/00* (2013.01); *H04L 5/0058* (2013.01);
(Continued)

(58) Field of Classification Search
CPC ............ H04L 2025/03802; H04L 5/00; H04L 5/0058; H04L 5/0094; H04W 52/365;
(Continued)

(56) References Cited

U.S. PATENT DOCUMENTS 6,628,928 B1    9/2003  Crosby et al.
8,315,661 B2 *  11/2012 Zong .................. H04W 52/367
                                                      455/226.1
(Continued)

FOREIGN PATENT DOCUMENTS

CN    101715207 A    5/2012
JP    2012-507960 A   3/2012
(Continued)

OTHER PUBLICATIONS

ZTE, "Power headroom reporting for carrier aggregation in LTE-Advanced," 3GPP TSG RAN WG1#60b, R1-101814, Apr. 16, 2010.
(Continued)

*Primary Examiner* — Robert J Lopata
(74) *Attorney, Agent, or Firm* — Morgan, Lewis & Bockius LLP

(57) ABSTRACT

An apparatus and method for transmitting a power headroom report in a communication system supporting multi-carriers are disclosed, by which a user equipment is enabled to transmit the power headroom report. According to the present invention, a user equipment calculates a power headroom for each of at least one activated serving cell using a maximum transmission power of the user equipment for each of at least one activated serving cell and transmits the power headroom report including the power headroom for (Continued)

each of the at least one activated serving cell and the maximum transmission power of the user equipment for each of the at least one activated serving cell to a base station. In this case, the power headroom includes an information on power status of the user equipment for each of the at least one activated serving cell.

20 Claims, 9 Drawing Sheets

Related U.S. Application Data continuation of application No. 13/112,416, filed on May 20, 2011, now Pat. No. 9,419,768.

(60) Provisional application No. 61/392,479, filed on Oct. 13, 2010, provisional application No. 61/389,721, filed on Oct. 5, 2010, provisional application No. 61/374,267, filed on Aug. 17, 2010.

(51) Int. Cl.
| | |
|---|---|
| *H04L 5/00* | (2006.01) |
| *H04W 76/19* | (2018.01) |
| *H04L 25/03* | (2006.01) |
| *H04W 88/02* | (2009.01) |

(52) U.S. Cl.
CPC ....... *H04L 5/0094* (2013.01); *H04W 72/0413* (2013.01); *H04W 72/0473* (2013.01); *H04W 76/19* (2018.02); *H04L 2025/03802* (2013.01); *H04W 88/02* (2013.01)

(58) Field of Classification Search
CPC ......... H04W 72/0413; H04W 72/0473; H04W 76/19; H04W 88/02
USPC ........................................................ 370/329
See application file for complete search history.

(56) References Cited

U.S. PATENT DOCUMENTS

| | | | | |
|---|---|---|---|---|
| 8,588,841 | B2* | 11/2013 | Mizuguchi | H04W 8/005 |
| | | | | 455/436 |
| 8,976,752 | B2 | 3/2015 | Kim et al. | |
| 10,200,229 | B2* | 2/2019 | Yu | H04L 27/2647 |
| 2001/0027113 | A1 | 10/2001 | Hayashihara | |
| 2002/0183059 | A1 | 12/2002 | Noreen | |
| 2007/0097962 | A1 | 5/2007 | Yoon et al. | |
| 2009/0303954 | A1 | 12/2009 | Guo | |
| 2009/0318180 | A1* | 12/2009 | Yi | H04W 52/365 |
| | | | | 455/522 |
| 2010/0111023 | A1 | 5/2010 | Pelletier et al. | |
| 2010/0113004 | A1 | 5/2010 | Cave et al. | |
| 2010/0158147 | A1 | 6/2010 | Zhang et al. | |
| 2010/0188969 | A1 | 7/2010 | Kim et al. | |
| 2010/0202392 | A1 | 8/2010 | Zhang et al. | |
| 2010/0238863 | A1 | 9/2010 | Guo et al. | |
| 2010/0273515 | A1 | 10/2010 | Fabien et al. | |
| 2010/0297993 | A1 | 11/2010 | Heo et al. | |
| 2011/0044247 | A1 | 2/2011 | Luo et al. | |
| 2011/0105173 | A1 | 5/2011 | Haim et al. | |
| 2011/0134774 | A1 | 6/2011 | Pelletier et al. | |
| 2011/0158117 | A1 | 6/2011 | Ho et al. | |
| 2011/0249638 | A1 | 10/2011 | Jen | |
| 2011/0274092 | A1 | 11/2011 | Liu et al. | |
| 2011/0292874 | A1 | 12/2011 | Ho et al. | |
| 2011/0310760 | A1 | 12/2011 | Wu et al. | |
| 2011/0319112 | A1* | 12/2011 | Jeong | H04W 52/146 |
| | | | | 455/509 |
| 2012/0040707 | A1 | 2/2012 | Kim et al. | |
| 2012/0044882 | A1 | 2/2012 | Kim et al. | |
| 2012/0046064 | A1 | 2/2012 | Baldemair et al. | |
| 2012/0083310 | A1 | 4/2012 | Zhao et al. | |
| 2012/0188995 | A1* | 7/2012 | Sihlbom | H04W 56/00 |
| | | | | 370/344 |
| 2012/0314640 | A1 | 12/2012 | Kim et al. | |
| 2013/0128829 | A1* | 5/2013 | Sebire | H04W 72/1284 |
| | | | | 370/329 |
| 2013/0188563 | A1* | 7/2013 | Kim | H04W 24/10 |
| | | | | 370/328 |
| 2013/0215849 | A1 | 8/2013 | Heo et al. | |
| 2013/0250889 | A1* | 9/2013 | Kim | H04L 5/001 |
| | | | | 370/329 |
| 2013/0343321 | A1* | 12/2013 | Nordstrom | H04W 72/1226 |
| | | | | 370/329 |
| 2014/0307681 | A1* | 10/2014 | Feuersaenger | H04L 5/0007 |
| | | | | 370/329 |
| 2015/0189604 | A1* | 7/2015 | Kim | H04W 52/367 |
| | | | | 370/329 |
| 2015/0351053 | A1* | 12/2015 | Jeong | H04W 24/10 |
| | | | | 455/522 |
| 2017/0006559 | A1 | 1/2017 | Kim et al. | |
| 2017/0094689 | A1* | 3/2017 | Lin | H04W 72/0453 |
| 2017/0223743 | A1* | 8/2017 | Lin | H04W 4/80 |
| 2017/0374683 | A1* | 12/2017 | Tavares | H04L 27/26 |
| 2018/0124836 | A1* | 5/2018 | Hong | H04W 74/006 |
| 2018/0131547 | A1* | 5/2018 | Wang | H04L 27/2602 |
| 2018/0279363 | A1* | 9/2018 | Su | H04W 74/0833 |
| 2019/0075602 | A1* | 3/2019 | Lin | H04L 5/0053 |

FOREIGN PATENT DOCUMENTS

| | | |
|---|---|---|
| JP | 2012-510785 A | 5/2012 |
| JP | 2012-517743 A | 8/2012 |
| JP | 2013-533673 A | 8/2013 |
| WO | 2010/051514 A1 | 5/2010 |
| WO | 2010-065759 A2 | 6/2010 |
| WO | 2010/091421 A1 | 8/2010 |
| WO | 2011/040598 A1 | 4/2011 |
| WO | 2011/105856 A1 | 9/2011 |
| WO | 2011/150361 A1 | 12/2011 |

OTHER PUBLICATIONS

Research in Motion, UK Limited, "Discussion on Per UE PHR," 3GPP TSG RAN WG1 Meeting #62, R1-104917, Madrid, Spain, Aug. 2010.
3GPP TS 36.321 V9.3.0, 3rd Generation Partnership Project Technical Specification Group Access Network Evolved Universal Terrestrial Radio Access(E-UTRA); Medium Access Control (MAC) protocol specification (Release9) (Jun. 2010.).
UE-specific Power headroom report, 3GPP TSG-RAN WG2 Meeting #70bis, R2-103602 (2010.06.28-07.03).
3GPP TSG-RAN WG1 #60bis "Power headroom reporting for carrier aggregation," Apr. 12-16, 2010, Beijing, China.
3GPP TSG-RAN WG1 #61 "Power headroom reporting for carrier aggregation," May 10-14, 2010, Montreal, Canada.
3GPP TSG RAN WG2 #60bis "UE transmission power headroom report for LTE," Jan. 14-18, 2008, Sevilla, Spain.
International Search Report cited in related Application No. PCT/KR2011/002738 dated Dec. 14, 2011.
Huawei, "Power Headroom Reporting for CA," 3GPP TSG-RAN WG2 Meeting #70bis, R2-103877, Stockholm, Sweden, Jun. 28-Jul. 2, 2010.
ZTE, "Parallel transmission of two types PHR," 3GPP TSG-RAN WG2 Meeting #70bis, R2-103725, Stockholm, Sweden, Jun. 28-Jul. 2, 2010.
EPO: Extended European Search Report for European Patent Application No. 11 81 8288.0—dated Dec. 10, 2013.
ASUTeK: "Power Control for Multiple Carriers;" 3GPP TSG RAN WG1 Meeting No. 60bis; Beijing, China; Apr. 12-16, 2010; R1-102355; XP050419580.

(56) References Cited

OTHER PUBLICATIONS

CATT: "Further Considerations on LTE—A Uplink Power Control;" 3GPP Draft; 3GPP TSG RAN WG1 Meeting No. 60; San Francisco, USA; Feb. 22-26, 2010; R1-100880; XP050418484.

* cited by examiner

FIG. 8

| C$_7$ | C$_6$ | C$_5$ | C$_4$ | C$_3$ | C$_2$ | C$_1$ | R |
|---|---|---|---|---|---|---|---|
| R | V | \multicolumn{6}{c|}{PH (Type 1, PCell)} |
| R | R | \multicolumn{6}{c|}{$P_{CMAX,c}$ 1} |
| R | V | \multicolumn{6}{c|}{PH (Type 1, Scell 1)} |
| R | R | \multicolumn{6}{c|}{$P_{CMAX,c}$ 2} |

...

| R | V | PH (Type 1, Scell n) |
|---|---|---|
| R | R | $P_{CMAX,c}$ m |

(a)

| C$_7$ | C$_6$ | C$_5$ | C$_4$ | C$_3$ | C$_2$ | C$_1$ | R |
|---|---|---|---|---|---|---|---|
| R | V | \multicolumn{6}{c|}{PH (Type 1, PCell)} |
| R | R | \multicolumn{6}{c|}{$P_{CMAX,c}$ 1} |
| R | V | \multicolumn{6}{c|}{PH (Type 1, Pcell)} |
| R | R | \multicolumn{6}{c|}{$P_{CMAX,c}$ 2} |
| R | V | \multicolumn{6}{c|}{PH (Type 1, Scell 1)} |
| R | R | \multicolumn{6}{c|}{$P_{CMAX,c}$ 3} |

...

| R | V | PH (Type 1, Scell n) |
|---|---|---|
| R | R | $P_{CMAX,c}$ m |

| | | | |
|---|---|---|---|
| R | R | PH: Type1 for Pcell | Oct1: type 1 |
| R | R | PH: Type 2 for Pcell | Oct2: type 2 |
| R | R | Pcmax,c for Pcell | Pcmax,c |
| R | R | PH Type1 for Scell | Type1 for Scell |
| R | R | Pcmax,c for Scell | Pcmax,c |
| ... | ... | ... | ... |

(a)

| | | | |
|---|---|---|---|
| R | R | PH: Type1 for Pcell | Oct1: type 1 |
| R | R | PH: Type 2 for Pcell | Oct2: type 2 |
| R | R | PH Type1 for Scell | Type1 for Scell |
| ... | ... | ... | ... |
| R | R | Pcmax,c for Pcell | Pcmax,c |
| R | R | Pcmax,c for Scell | Pcmax,c |
| ... | ... | ... | ... |

| R | R | Pcmax.c for Pcell |
|---|---|---|
| R | R | Pcmax.c for Scell |
| ... | ... | ... |

Pcmax.c
Pcmax.c
...

(a)

| R | R | R | R | R | Cell Index |
|---|---|---|---|---|---|
| R | R | Pcmax.c ||||

Pcmax.c (b)

| Cell Index | Pcmax.c |
|---|---|

Pcmax.c (c)

APPARATUS AND METHOD FOR TRANSMITTING A POWER HEADROOM REPORT IN A WIRELESS COMMUNICATION SYSTEM SUPPORTING MULTI-CARRIERS

This application claims the benefit of the Korean Patent Application No. 10-2011-0027047, filed on Mar. 25, 2011, which is hereby incorporated by reference as if fully set forth herein.

This application also claims the benefit of U.S. Provisional Application Ser. No. 61/374,267, filed on Aug. 17, 2010, 61/389,721, filed on Oct. 5, 2010, and 61/392,479, filed on Oct. 13, 2010, the content of which is hereby incorporated by reference herein in their entirety.

BACKGROUND OF THE INVENTION

Field of the Invention

The present invention relates to a wireless communication system, and more particularly, to an apparatus and method for transmitting a power headroom report in a communication system supporting multi-carriers.

Discussion of the Related Art

First of all, in the following description, 3GPP LTE ($3^{rd}$ generation partnership projecting long term evolution, hereinafter abbreviated LTE) is schematically explained as an example of a mobile communication system to which the present invention is applicable.

FIG. 1 is a schematic diagram of E-UMTS network structure as an example of a mobile communication system. In particular, E-UMTS (evolved universal mobile telecommunications system) is the system evolved from a conventional UMTS (universal mobile telecommunications system) and its basic standardization is ongoing by 3GPP. Generally, E-UMTS can be called LTE (long term evolution) system.

Referring to FIG. 1, E-UMTS consists of a user equipment (UE), base stations (eNode B: eNB) 110a and 110b and an access gateway (AG) provided to an end terminal of a network (E-UTRAN) to be connected to an external network. The base station is able to simultaneously transmit multi-data streams for a broadcast service, a multicast service and/or a unicast service.

At least one or more cells exist in one base station. The cell is set to one of bandwidths including 1.25 MHz, 2.5 MHz, 5 MHz, 10 MHz, 15 MHz, 20 MHz and the like and then provides an uplink or downlink transmission service to a plurality of user equipments. Different cells can be set to provide different bandwidths, respectively. A base station controls data transmissions and receptions for a plurality of user equipments. A base station sends downlink scheduling information on downlink (DL) data to inform a corresponding user equipment of time/frequency region for transmitting data to the corresponding user equipment, coding, data size, HARQ (hybrid automatic repeat and request) relevant information and the like. And, the base station sends uplink scheduling information on uplink (UL) data to a corresponding user equipment to inform the corresponding user equipment of time/frequency region available for the corresponding user equipment, coding, data size, HARQ relevant information and the like. An interface for user or control traffic transmission is usable between base stations. A core network (CN) can consist of an AG, a network node for user registration of a user equipment and the like. The AG manages mobility of the user equipment by a unit of TA (tracking area) including a plurality of cells.

The wireless communication technology has been developed up to LTE based on WCDMA (wideband code division multiple access) but the demands and expectations of users and service providers are continuously rising. Since other radio access technologies keep being developed, new technological evolution is requested to become competitive in the future. For this, reduction of cost per bit, service availability increase, flexible frequency band use, simple-structure and open interface, reasonable power consumption of user equipment and the like are required.

Recently, 3GPP is working on the standardization of the next technology for LTE. In the present specification of the present invention, the next technology shall be named 'LIE-Advanced' or 'LTE-A'. Major differences between the LTE system and the LTE-A system include a system bandwidth difference and a relay introduction.

The LTE-A system has a goal to support a broadband of maximum 100 MHz. For this, the LTE-A system uses carrier aggregation or bandwidth aggregation to achieving a broadband using a plurality of frequency blocks. The carrier aggregation enables a plurality of frequency blocks to be used as one large logic frequency band to use a wider frequency band. A bandwidth of each frequency block can be defined based on a system block used by the LTE system. And, each frequency block is transmitted using a component carrier.

However, as the LET-S system of the next communication system adopts the carrier aggregation, the demand for a method of transmitting a power headroom report of a user equipment in a mobile communication system supporting multi-carriers is rising.

SUMMARY OF THE INVENTION

Accordingly, the present invention is directed to an apparatus and method for transmitting a power headroom report in a communication system supporting multi-carriers that substantially obviate one or more problems due to limitations and disadvantages of the related art.

An object of the present invention is to provide an apparatus and method for transmitting a power headroom report (hereinafter abbreviated PHR) in a communication system supporting multi-carriers, by which a user equipment is enabled to transmit the power headroom report.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of transmitting a power headroom report, which is transmitted by a user equipment, in a communication system supporting multi-carriers according to the present invention includes the steps of calculating a power headroom for each of at least one activated serving cell using a maximum transmission power of the user equipment for each of the at least one activated serving cell and transmitting the power headroom report including the power headroom for each of the at least one activated serving cell and the maximum transmission power of the user equipment for each of the at least one activated serving cell to a base station. Moreover, the power headroom includes an information on power status of the user equipment for each of the at least one activated serving cell.

Preferably, the power headroom report includes a first type power headroom for each of the at least one activated serving cell and the first type power headroom is calculated using a power of a physical uplink shared channel PUSCH.

More preferably, if the user equipment simultaneously transmits a physical uplink control channel (PUCCH) and the PUSCH, the power headroom report further includes a second type power headroom of a primary cell among the at least one or more activated cells. And, the second type power headroom is calculated using a power of the PUSCH and a power of the PUCCH. Moreover, the primary cell operates on a primary frequency used by the user equipment in an initial connection setting or resetting process.

Preferably, the user equipment transmits the power headroom report each time a periodic power headroom reporting timer (periodicPHR-Timer) expires and the user equipment restarts the periodic power headroom reporting timer after transmitting the power headroom report.

More preferably, the periodic power headroom reporting timer is transmitted by the base station via RRC (radio resource control) message.

Preferably, if a prohibit power headroom reporting timer (prohibit PHR-Timer) expires and a downlink pathloss is changed over a predetermined value, the user equipment transmits the power headroom report. And, the user equipment restarts the prohibit power headroom reporting timer after transmitting the power headroom report.

More preferably, the prohibit power headroom reporting timer and the predetermined value are transmitted from the base station via RRC (radio resource control) message.

Preferably, the power headroom report is transmitted via MAC message.

Preferably, the method further includes the steps of receiving an allocation of a resource determined using the power headroom for each of the at least one activated serving cell and the maximum transmission power of the user equipment for each of the at least one activated serving cell.

In another aspect of the present invention, a method of receiving a power headroom report, which is received by a base station, in a communication system supporting multi-carriers, includes the steps of receiving the power headroom report including a power headroom for each of at least one activated serving cell and a maximum transmission power of a user equipment for each of the at least one activated serving cell from the user equipment and allocating a resource to the user equipment using the power headroom for each of the at least one activated serving cell and the maximum transmission power of the user equipment for each of the at least one activated serving cell. Moreover, the power headroom for each of the at least one activated serving cell is calculated using the maximum transmission power of the user equipment for each of the at least one activated serving cell and the power headroom includes an information on power status of the user equipment for each of the at least one activated serving cell.

In another aspect of the present invention, a user equipment in a communication system supporting multi-carriers includes a processor calculating a power headroom for each of at least one activated serving cell using a maximum transmission power of the user equipment for each of the at least one activated serving cell and a transmitting module transmitting a power headroom report including the power headroom for each of the at least one activated serving cell and the maximum transmission power of the user equipment for each of the at least one activated serving cell to a base station. Moreover, the power headroom includes an information on power status of the user equipment for each of the at least one activated serving cell.

In a further aspect of the present invention, a base station in a communication system supporting multi-carriers includes a receiving module receiving a power headroom report including a power headroom for each of at least one activated serving cell and a maximum transmission power of a user equipment for each of the at least one activated serving cell from the user equipment and a processor allocating a resource to the user equipment using the power headroom for each of the at least one activated serving cell and the maximum transmission power of the user equipment for each of the at least one activated serving cell. Moreover, the power headroom for each of the at least one activated serving cell is calculated using the maximum transmission power of the user equipment for each of the at least one activated serving cell and the power headroom includes an information on power status of the user equipment for each of the at least one activated serving cell.

Accordingly, the present invention provides the following effect and/or advantage. First of all, since a user equipment transmits its maximum transmission power for each of at least one activated serving cell to a base station, the base station is able to efficiently allocate resources to the user equipment.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 8 is a diagram for one example of PHR MAC control element;

FIG. 9 is a diagram for another example of PHR MAC control element;

FIG. 10 is a diagram for further example of PHR MAC control element; and

DETAILED DESCRIPTION OF THE INVENTION

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station is a common name of such a random node of a network stage communicating with a terminal as a Node B (NB), an eNode B (eNB), a base station (BS), an access point (AP) and the like. Although the present specification is described based on 3GPP LTE system and 3GPP LTE-A system, the substances of the present invention are applicable to various kinds of communication system.

In a mobile communication system, a user equipment is able to receive information in downlink and is able to transmit information in uplink as well. Informations transmitted or received by the user equipment include various kinds of data and control informations. In accordance with the species and usage of the information transmitted or received by the user equipment, various physical channels exist.

In the following description, a frame structure of 3GPP LTE system for example of a mobile communication system is explained with reference to the accompanying drawings.

Figure 1:
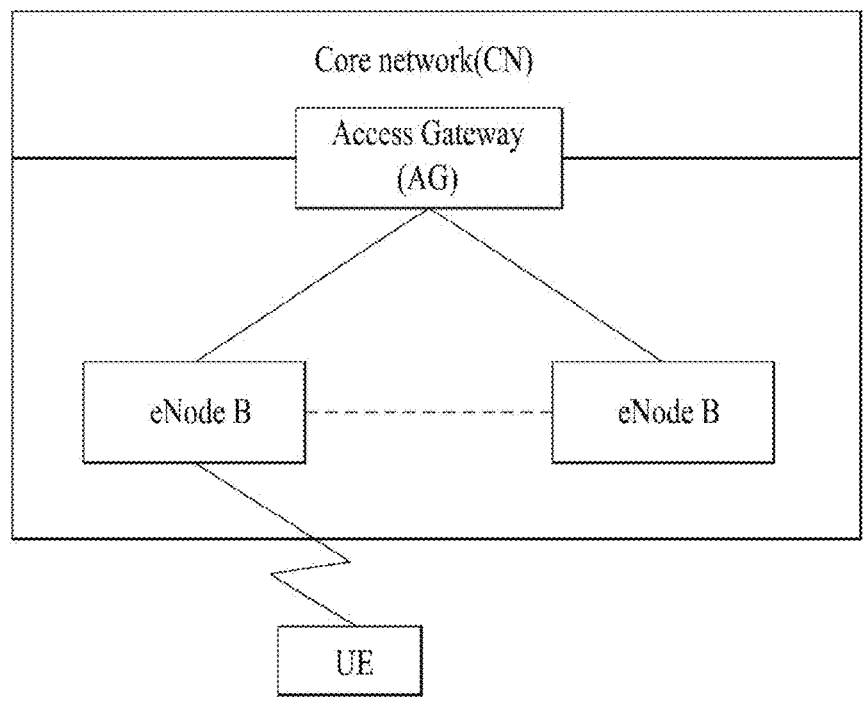
FIG. 1 is a schematic diagram of E-UMTS network structure as an example of a mobile communication system.
Figure 2:
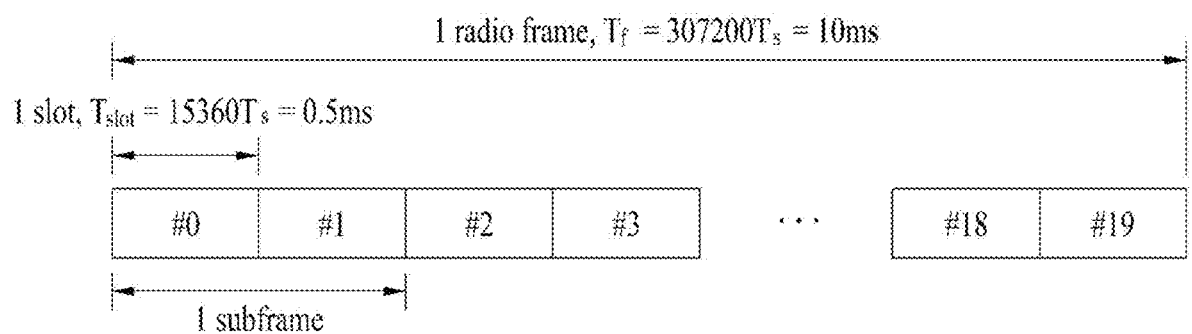
FIG. 2 is a diagram for an example of a structure of a radio frame used in LTE system.

FIG. 2 is a diagram for an example of a frame structure used in LTE system.

Referring to FIG. 2, a radio frame has a length of 10 ms ($327200 \cdot T_s$) and is constructed with 10 subframes in equal size. Each of the subframes has a length of 1 ms and is constructed with two slots. Each of the slots has a length of 0.5 ms ($15360 \cdot T_s$). In this case, $T_s$ indicates a sampling time and is expressed as $T_s=1/(15\ \text{kHz} \times 2048)=3.2552 \times 10^{-8}$ (about 33 ns). The slot includes a plurality of OFDM symbols or SC-FDMA symbols in a time domain and also includes a plurality of resource blocks (RBs) in a frequency domain.

In the LTE system, one resource block (RB) includes '12 subcarriers×7 or 6 OFDM or SC-FDMA (single carrier-frequency division multiple access) symbols'. A transmission time interval (hereinafter abbreviated TTI), which is a unit time for transmitting data, can be determined by at least one subframe unit. The above-described structure of the radio frame is just exemplary. And, the number of subframes included in a radio frame, the number of slots included in a subframe and/or the number of OFDM or SC-FDMA symbols included in a slot can be modified in various ways.

Figure 3A:
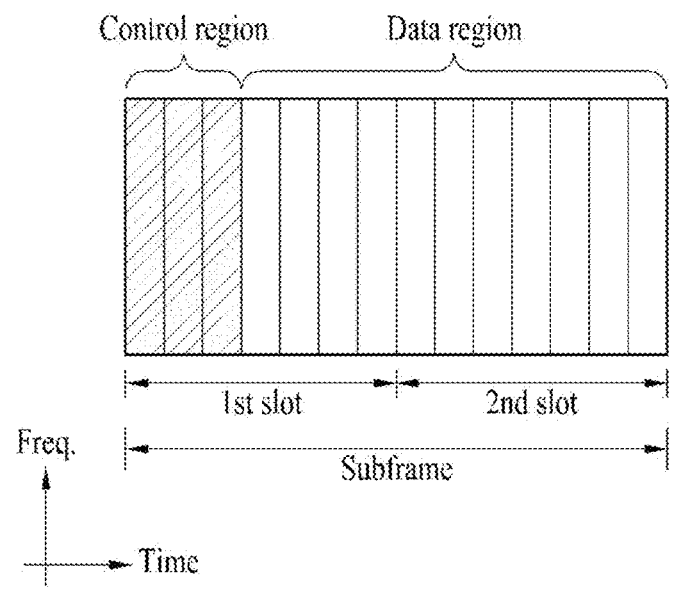
FIG. 3(a) is a diagram for a downlink subframe structure in LTE system.
Figure 3B:
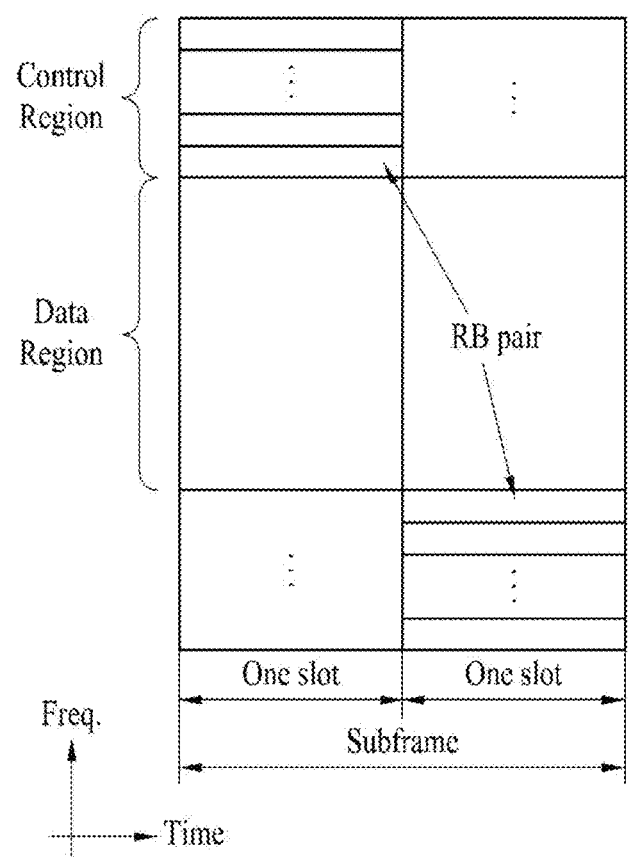
FIG. 3B is a diagram for an uplink subframe structure in LTE system.

FIG. 3(a) is a diagram for a downlink subframe structure in LTE system. And, FIG. 3B is a diagram for an uplink subframe structure in LTE system.

Referring to FIG. 3(a), one downlink (hereinafter abbreviated DL) subframe includes 2 slots in a time domain. Maximum 3 fore OFDM symbols of the first slot within the DL subframe correspond to a control region for allocating control channels thereto and the rest of the OFDM symbols correspond to a data zone for allocating PDSCH (physical downlink shared channel) thereto.

DL control channels used in 3GPP LTE system or the like include PCFICH (physical control format indicator channel), PDCCH (physical downlink control channel), PHICH (physical hybrid-ARQ indicator channel), etc. The PCFICH carried on a first OFDM symbol carries the information on the number of OFDM symbols (i.e., a size of a control region) used for the transmission of control channels within a subframe. The control information carried on the PDCCH is called downlink control information (hereinafter abbreviated DCI). The DCI indicates a UL resource allocation information, a DL resource allocation information, a UL transmission power control command for random user equipment groups and the like. The PHICH carries ACK/NACK (acknowledgement/negative acknowledgement) signal for UL HARQ (hybrid automatic repeat request). In particular, the ACK/NACK signal for UL data transmitted by a user equipment is carried on PHICH.

In the following description, PDCCH of DL physical channel is explained.

First of all, a base station is able to transmit resource allocation and transmission format (this is called DL grant) of PDSCH, resource allocation information (this is called UL grant) of a physical UL shared channel, an aggregation of transmission power control commands for a random user equipment and individual user equipments in a group, activation of VoIP (voice over internet protocol) and the like via PDCCH. A plurality of PDCCHs can be transmitted within a control region and a user equipment is able to monitor a plurality of the PDCCHs. The PDCCH is constructed with aggregation of one or several contiguous CCEs (control channel elements). The PDCCH constructed with the aggregation of one or several CCEs and can be transmitted via the control region after completion of subblock interleaving. The CCE is a logical allocation unit used to provide the PDCCH with a coding rate in accordance with a status of a radio channel. The CCE corresponds to a plurality of resource element groups. The format of the PDCCH and the bit number of available PDCCH are determined in accordance with the correlation between the number of CCEs and the coding rate provided by the CCEs.

The control information carried on the PDCCH is called a DL control information (hereinafter abbreviated DCI). Table 1 shows the DCI according to DCI format.

TABLE 1

| DCI Format | Description |
| --- | --- |
| DCI format 0 | used for the scheduling of PUSCH |
| DCI format 1 | used for the scheduling of one PDSCH codeword |
| DCI format 1A | used for the compact scheduling of one PDSCH codeword and random access procedure initiated by a PDCCH order |

TABLE 1-continued

| DCI Format | Description |
| --- | --- |
| DCI format 1B | used for the compact scheduling of one PDSCH codeword with precoding information |
| DCI format 1C | used for very compact scheduling of one PDSCH codeword |
| DCI format 1D | used for the compact scheduling of one PDSCH codeword with precoding and power offset information |
| DCI format 2 | used for scheduling PDSCH to UEs configured in closed-loop spatial multiplexing mode |
| DCI format 2A | used for scheduling PDSCH to UEs configured in open-loop spatial multiplexing mode |
| DCI format 3 | used for the transmission of TPC commands for PUCCH and PUSCH with 2-bit power adjustments |
| DCI format 3A | used for the transmission of TPC commands for PUCCH and PUSCH with single bit power adjustments |

Referring to Table 1, DCI format 0 indicates UL resource allocation information, DCI formats 1-2 indicate DL resource allocation information, and DCI format 3 or 3A indicates a transmission power control (hereinafter abbreviated TPC) command for random UE groups.

DCI format 3/3A includes TPC commands for a plurality of user equipments. In case of the DCI format 3/3A, a base station masks CRC with TPC-ID. In this case, the TPC-ID is an identifier that is demasked by a user equipment to monitor the PDCCH carrying the TPC command. And, it can be said that the TPC-ID is an identifier used by a user equipment to check a presence or non-presence of the transmission of the TPC command on PDCCH. It is able to define the TPC-ID reusing such a conventional identifier as C-RNTI (radio network temporary identifier), PI-RNTI, SC-RNTI and RA-RNTI or using new identifier. The TPC-ID is an identifier for a specific aggregation of user equipments within a cell, which is different from C-RNTI as an identifier for a specific user equipment. And, the TPC-ID is different from such an identifier for all user equipments within a cell as PI-RNTI, SC-RNTI and RA-RNTI. In case that a DCI includes TPC commands for N user equipments, it is necessary for the N user equipments to receive the TPC commands only. In case that TPC commands for all user equipments within a cell are included in a DCI, the TPC-ID becomes an identifier for all the user equipments within the cell.

A user equipment searches a search space within a subframe for a TPC-ID by monitoring an aggregation of PDCCH candidates. In this case, the TPC-ID can be found from a shared search space or a UE-specific search space. In this case, the shared search space is the search space searched by all user equipments within a cell. And, the UE-specific space means the search space searched by a specific user equipment. If a CRC error is not detected in a manner of demasking TPC-ID in the corresponding PDCCH candidate, a user equipment is able to receive a TPC command on PDCCH.

TPC-ID, which is an identifier for PDCCH carrying a plurality of TPC commands only, is defined. If the TPC-ID is detected, a user equipment receives a TPC command on a corresponding PDCCH. In this case, the TPC command is used to adjust a transmission power of an UL channel. Therefore, it is able to prevent a failure in transmission to a base station or an interference with another user equipment due to an incorrect power control.

A scheme of mapping resource for PDCCH transmission in a base station of LTE system is schematically described as follows.

First of all, a base station is generally able to transmit scheduling allocation information and other control informations on PDCCH. A physical control channel can be transmitted as one aggregation or a plurality of contiguous control cannel elements (CCEs). In this case, one control channel element (hereinafter abbreviated CCE) includes 9 resource element groups (REGs). The number of REGs failing to be allocated to PCFICH (physical control format indicator channel) or PHICH (physical hybrid automatic repeat request indicator channel) is $N_{REG}$. The number of CCEs available for a system ranges 0 to '$N_{CCE}-1$', where $N_{CCE}=\lfloor N_{REG}/9 \rfloor$. The PDCCH supports such a multiple format as shown in Table 2. One PDCCH including n contiguous CCEs starts with a CCE that executes 'i mod n=0', where 'i' is a CCE number. Multiple PDCCHs can be transmitted as one subframe.

TABLE 2

| PDCCH format | Number of CCEs | Number of resource-element groups | Number of PDCCH bits |
| --- | --- | --- | --- |
| 0 | 1 | 9 | 72 |
| 1 | 2 | 18 | 144 |
| 2 | 4 | 36 | 288 |
| 3 | 8 | 72 | 576 |

Referring to Table 2, a base station is able to determine a PDCCH format in accordance with how many regions will receive control information and the like. And, a user equipment is able to reduce overhead by reading the control information and the like by CCE unit.

Referring to FIG. 3(b), a UL subframe can be divided into a control region and a data region in a frequency domain. The control region is allocated to a physical UL control channel (PUCCH) carrying UL control information. And, the data region is allocated to a physical UL shared channel (PUSCH) for carrying user data. In order to maintain the single charier property, one user equipment does not transmit PUCCH and PUSCH simultaneously. PUCCH for one user equipment is allocated as an RB pair in one subframe. RBs belonging to the RB pair occupy different subcarriers in two slots, respectively. And, frequency hopping is performed on the RB pair allocated to the PUCCH on a slot boundary.

Figure 4:
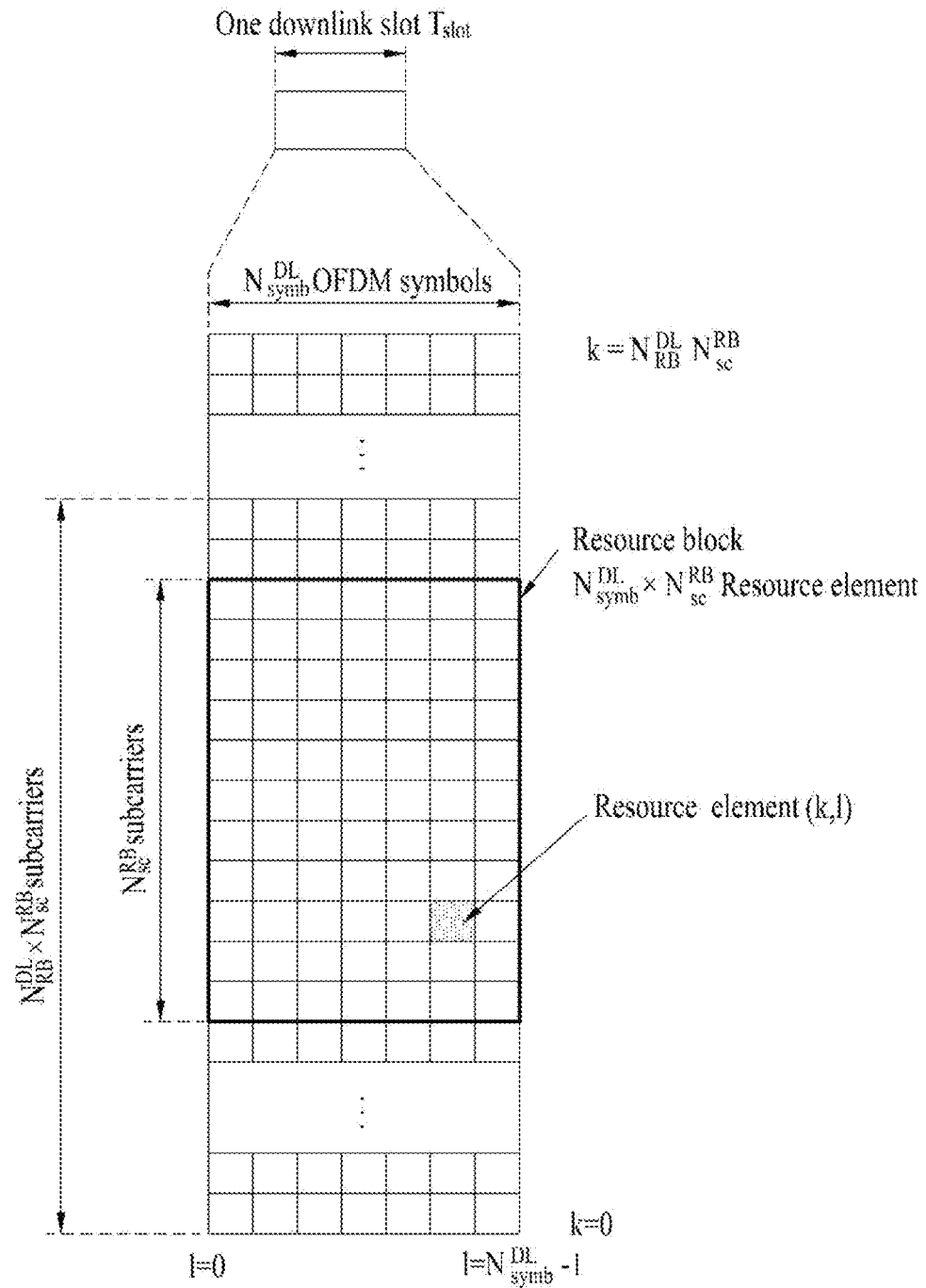
FIG. 4 is a diagram of a downlink time-frequency resource grid structure in 3GPP LTE system.

FIG. 4 is a diagram of a downlink time-frequency resource grid structure in 3GPP LTE system.

Referring to FIG. 4, a DL signal transmitted in each slot uses a resource grid structure constructed with $N^{DL}_{RB}*N^{RB}_{SC}$ subcarriers and $N^{DL}_{symb}$ OFDM (Orthogonal Frequency Division Multiplexing) symbols. In this case, '$N^{DL}_{RB}$' indicates the number of resource blocks (RBs) in DL, '$N^{RB}_{SC}$' indicates the number of subcarriers constructing one RB, and '$N^{DL}_{symb}$' indicates the number of OFDM symbols in one DL slot. A size of '$N^{DL}_{RB}$' varies in accordance with a DL transmission bandwidth configured within a cell and should meet '$N^{min,DL}_{RB} \leq N^{DL}_{RB} \leq N^{max,DL}_{RB}$'. In this case, '$N^{min,DL}_{RB}$' is a smallest DL bandwidth supported by a wireless communication system and '$N^{max,DL}_{RB}$' is a greatest DL bandwidth supported by the wireless communication system. It may become '$N^{min,DL}_{RB}=6$' and '$N^{max,DL}_{RB}=110$', by which the present example is non-limited. The number of the OFDM symbols included in one slot can vary in accordance with a length of a CP (cyclic prefix) and an interval of subcarrier. In caser of multi-antennal transmission, one resource grid can be defined for each antenna port.

Each element within the resource grid for each antenna port is called a resource element (hereinafter abbreviated RE) and is uniquely identified by an index pair (k, l) within a slot. In this case, 'k' is an index in a frequency domain and 'l' is an index in a time domain. The 'k' has a value selected from '0, . . . , $N^{DL}_{RB}N^{RB}_{SC}$−1' and the 'l' has a value selected from '0, . . . , $N^{DL}_{symb}$−1'.

The resource block shown in FIG. 4 is used to describe the mapping relation between a prescribed physical channel and resource elements. Resource blocks can be classified into physical resource blocks (PRBs) and virtual resource blocks (VRBs). One PRB can be defined by $N^{DL}_{symb}$ contiguous OFDM symbols in time domain and $N^{RB}_{SC}$ contiguous subcarriers in frequency domain. In this case, '$N^{DL}_{symb}$' and '$N^{RB}_{SC}$' can be given as shown in Table 3. Hence, one PRB is constructed with '$N^{DL}_{symb} \times N^{RB}_{SC}$' resource elements. One PRB corresponds to one slot in time domain and also corresponds to 180 kHz in frequency domain, by which the present example is non-limited.

TABLE 3

| Configuration | | $N_{sc}^{RB}$ | $N_{symb}^{DL}$ |
|---|---|---|---|
| Normal cyclic prefix | Δf = 15 kH | 12 | 7 |
| Extended cyclic prefix | Δf = 15 kH | | 6 |
| | Δf = 7.5 kH | 24 | 3 |

PRB has a value ranging 0 to '$N^{DL}_{RB}$−1' in frequency domain. The relation between the PRB number ($n_{PRB}$) in frequency domain and the resource element (k, l) in one slot satisfies $$n_{PRB} = \left\lfloor \frac{k}{N_{sc}^{RB}} \right\rfloor.$$

In this case, a size of the VRB is equal to that of PRB. The VRB can be defined in a manner of being categorized into a localized VRB (hereinafter abbreviated LVRB) and a distributed VRB (hereinafter abbreviated DVRB). For the VRB of each type, a single VRB number '$n_{VRB}$' is allocated to a pair of VRBs in two slots within one subframe.

The VRB can have a size equal to that of the PRB. VRBs of two types can be defined as follows. First of all, the first type is the localized VRB (LVRB). And, the second type is the distributed VRB (DVRB). For the VRB of each of the types, a pair of VRBs are allocated across two slots of one subframe with a single VRB index (hereinafter named a VRB number). In particular, one index selected from the group consisting of 0 to '$N^{DL}_{RB}$−1' is allocated to $N^{DL}_{RB}$ VRBs belonging to a first one of the two slots constructing one subframe. And, one index selected from the group consisting of 0 to '$N^{DL}_{RB}$−1' is allocated to $N^{DL}_{RB}$ VRBs belonging to a second one of the two slots constructing one subframe as well.

In the following description, a process for a base station to send PDCCH to a user equipment in downlink is explained.

First of all, a base station determines a PDCCH format in accordance with a DCI (downlink control information) which is to be sent to a user equipment and then attaches a CRC (cyclic redundancy check) to a control information. In this case, the CRC is masked with a unique identifier, which will be called a radio network temporary identifier (hereinafter abbreviated RNTI), in accordance with an owner or usage of PDCCH. If the PDCCH is provided for a specific user equipment, the CRC can be masked with a unique identifier of a user equipment, e.g., C-RNTI (cell-RNTI). If the PDCCH is provided to a paging message, the CRC can be masked with a paging indication identifier, e.g., P-RNTI (paging-RNTI). If the PDCCH is provided for a system information, the CRC can be masked with a system information identifier, e.g., SI-RNTI (system information-RNTI). In order to indicate a random access response which is the response to a transmission of a random access preamble of a user equipment, the CRC can be masked with RA-RNTI (random access-RNTI). Table 4 shows examples of an identifier that masks PDCCH.

TABLE 4

| Type | Identifier | Description |
|---|---|---|
| UE-specific | C-RNTI | used for the UE corresponding to the C-RNTI. |
| Common | P-RNTI | used for paging message. |
| | SI-RNTI | used for system information (It could be differentiated according to the type of system information). |
| | RA-RNTI | used for random access response (It could be differentiated according to subframe or PRACH slot index for UE PRACH transmission). |
| | TPC-RNTI | used for uplink transmit power control command (It could be differentiated according to the index of UE TPC group). |

If C-RNTI is used, PDCCH carries a control information for a corresponding specific user equipment. If a different RNTI is used, PDCCH carries a shared control information received by all or a plurality of user equipments within a cell. The base station generates a coded data by performing a channel coding on the CRC attached DCI. The base station then performs a rate matching according to the number of CCEs allocated to the PDCCH format. subsequently, the base station generates modulated symbols by modulating the coded data. Thereafter, the base station maps the modulated symbols to the physical resource elements.

Meanwhile, 3GPP (3$^{rd}$ generation partnership project) designates LTE-A (long term evolution-advanced) system to a next generation wireless communication system next to the LTE system to meet the future-oriented service request. The LTE-A system adopts the carrier aggregation (hereinafter abbreviated CA) technology to aggregate and use a plurality of component carriers (CCs). Therefore, the LTE-A system enhances a transmission bandwidth of a user equipment and also increases frequency use efficiency. The LTE-A system is able to extend bandwidths up to 100 MHz through the carrier aggregation. In particular, the LTE-A system re-defines the carrier defined by the conventional LTE rel 8/9 up to maximum 20 MHz into a component carrier and enables one user equipment to use maximum 5 component carriers through the carrier aggregation technology.

The current carrier aggregation technology can be characterized as follows. First of all, the current carrier aggregation technology supports the aggregation of continuous component carriers and the aggregation of discontinuous component carriers. The number of carriers aggregated in UL can be different from that of carriers aggregated in DL. If the compatibility with a conventional system is required, each of the UL and the DL should be constructed with the same number of component carriers. For a user equipment, each component carrier independently carries one transport block and is provided with an independent HARQ (hybrid automatic repeat request) mechanism.

Unlike the conventional LTE system that uses one component carrier, the carrier aggregation, which uses a plurality of component carriers, needs a method of managing component carriers effectively. In order to efficiently mange component carriers, it is able to classify the component carriers in accordance with roles and features. For instance, the component carriers can be classified into primary component carrier (PCC) and a secondary component carrier (SCC). In particular, the primary component carrier is the component carrier that becomes the center of management of component carriers in case of using several component carriers. And, one primary component carrier is defined for each user equipment.

The rest of the component carriers except one primary component carrier are defined as secondary component carriers. The primary component carrier is able to play a role as a core carrier for managing all component carriers. And, the rest of the sub-component carriers can play a role in providing an additional frequency resource to provide a high data rate.

The primary component carrier can be called a primary cell, while the sub-component carrier is called a secondary cell. In particular, the primary cell means the cell working on a primary frequency used by a user equipment in the process for initial connection establishment or connection re-establishment. And, the secondary cell means the cell working on a secondary frequency used to provide an additional radio resource. And, the primary cell and all secondary cells can be called serving cells.

The base station is able to allocate an activated component carrier (hereinafter abbreviated ACC) among a plurality of component carriers to the user equipment. The user equipment is already aware of the activated component carrier (ACC) allocated to itself. According to an embodiment of the present invention, the user equipment reports a power headroom (hereinafter abbreviated PH) for each of at least one activated component carrier (ACC) allocated to itself to the base station.

In the following description, a method of transmitting a power headroom report according to an embodiment of the present invention is explained with reference to the accompanying drawings.

Figure 5:
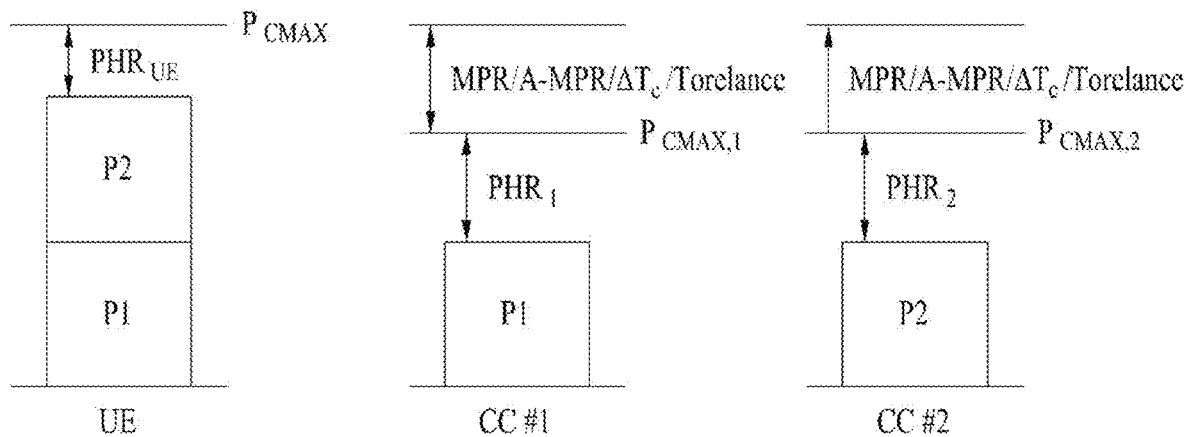
FIG. 5 is a diagram for power allocation of a user equipment in case of applying carrier aggregation.

FIG. 5 is a diagram for power allocation of a user equipment in case of applying carrier aggregation.

Referring to FIG. 5, $P_{CMAX}$ indicates a maximum power of a UE. $P_{CMAX, 1}$ indicates a maximum power a UE can transmit via a component carrier 1. $P_{CMAX, 2}$ indicates a maximum power a UE can transmit via a component carrier 2. P1 indicates a power allocated to the component carrier 1. P2 indicates a power allocated to the component carrier 2. $PHR_1$ indicates a power headroom for the component carrier 1. $PHR_2$ indicates a power headroom for the component carrier 2. PMR (maximum power reduction) indicates a maximum power reduction according to modulation and channel bandwidth. A-MPR (additional maximum power reduction) means an additional maximum power reduction according to a region and bandwidth. And, $PHR_{UE}$ means power status of a user equipment. A user equipment selects $P_{CMAX, c}$ within a predetermined range in consideration of MPR, A-MPR and the like. And, $PHR_c$ is calculated according to $P_{CMAX, c}$.

Referring to FIG. 5, assuming '$P_{CMAX}$=23 dBm', '$P_{CMAX,1}$=$P_{CMAX,2}$=22 dBm' and '$PHR_1$=$PHR_2$=2 dBm', it becomes '$P_1$=$P_2$=20 dBm' and '$PHR_{UE}$=0 dBm'. Yet, if the user equipment transmits $PHR_1$ and $PHR_2$ to the base station only, since the base station is not aware of $PHR_{UE}$, the base station is able to instruct the user equipment to raise the power of each of the component carrier 1 and the component carrier 2 by 2 dBm. If so, it causes a problem that a quality of service (QoS) is reduced in aspect of the user equipment.

In order to solve the above-described problem, according to an embodiment of the present invention, the user equipment transmits $P_{CMAX, c}$ to the base station. If so, the base station calculates Pc using $PHR_c$ and $P_{CMAX, c}$ and is also able to calculate $PHR_{UE}$ using $P_c$.

Figure 6:
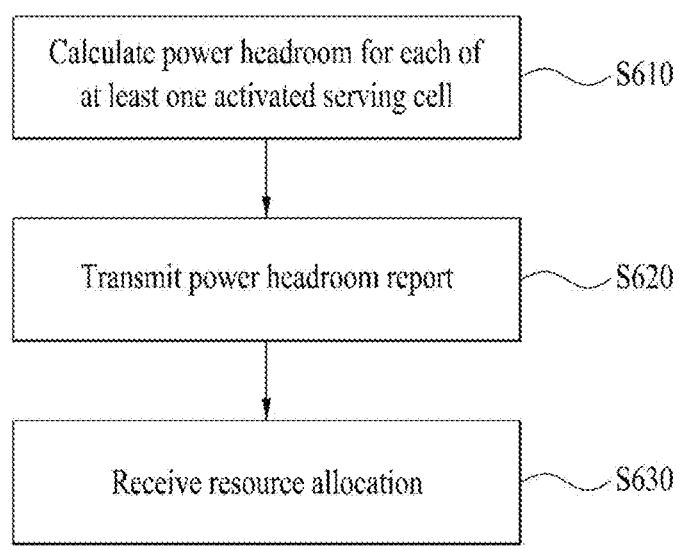
FIG. 6 is a flowchart for a method of transmitting a power headroom report according to an embodiment of the present invention.

FIG. 6 is a flowchart for a method of transmitting a power headroom report according to an embodiment of the present invention.

Referring to FIG. 6, a user equipment calculates a power headroom for each of at least one or more activated serving cells [S610].

In doing so, power headrooms of two types are defined. The first type power headroom is calculated using PUSCH power. And, the second type power headroom is calculated using PUSCH power and PUCCH power.

In case that the user equipment transmits PUSCH to the serving cell c in the subframe i, the first type power headroom is defined as Formula 1. In case that the user equipment does not transmit PUSCH to the serving cell c in the subframe i, the first type power headroom is defined as Formula 2.

$$PH_{type1,c}(i)=P_{CMAX,c}(i)-\{10\log_{10}(M_{PUSCH,c}(i))+P_{O\_PUSCH,c}(j)+\alpha_c(j)\cdot PL_c+\Delta_{TF,c}(i)f_c(i)\} \text{ [dB]} \quad \text{[Formula 1]}$$

$$PH_{type1,c}(i)=P_{CMAX,c}(i)-\{P_{O\_PUSCH,c}(j)+\alpha_c(j)\cdot PL_c+f_c(i)\} \text{ [dB]} \quad \text{[Formula 2]}$$

In Formula 1 and Formula 2, $PH_{type1,c}(i)$ indicates a first type power headroom for a serving cell c in a subframe i. And, $P_{CMAX,c}(i)$ indicates a maximum transmission power for the serving cell c in the subframe i.

$M_{PUSCH,c}(i)$ indicates a bandwidth of a PUSCH resource allocation for the service cell c in the subframe i represented as a valid resource block number and is a value allocated to the user equipment by the base station. $P_{O\_PUSCH,c}(j)$ is a parameter constructed with a sum of $P_{O\_NOMINAL\_PUSCH,c}(i)$, which is a cell-specific nominal component provided by a higher layer and $P_{O\_UE\_PUSCH,c}(i)$, which is a UE-specific component provided by the higher layer, and is the value notified to the user equipment by the base station. $\alpha(j)$ is a cell-specific parameter, which is provided by the higher layer and is then transmitted by the base station using 3 bits. If j=0 or 1 일 때, it becomes '$\alpha \in \{0, 0.4, 0.5, 0.6, 0.7, 0.8, 0.9, 1\}$'. If j=2, it becomes '$\alpha(j)$=1'. In this case, $\alpha(j)$ is the value notified to the user equipment by the base station.

$PL_c$ is a DL path loss estimated value calculated by the user equipment by dB unit and can be represented as 'PL=referenceSignalPower-higher layer filteredRSRP'. $f_c(i)$ is a value indicating a current PUSCH power control adjusted state and can be represented as a current absolute value or a cumulative value.

In case that a user equipment simultaneously transmits both PUCCH and PUSCH for a primary cell in a subframe i, a second type power headroom is defined as Formula 3. In case that a user equipment only transmits PUSCH for a primary cell in a subframe i without transmitting PUCCH, a second type power headroom is defined as Formula 4. In case that a user equipment only transmits PUCCH for a primary cell in a subframe i without transmitting PUSCH, a second type power headroom is defined as Formula 5. In case that a user equipment does not transmit PUSCH and PUCCH for a primary cell in a subframe i, a second type power headroom is defined as Formula 6.

[Formula 3]
$$PH_{type2}(i) = P_{CMAX,c}(i) - 10\log_{10}$$
$$\left( \begin{array}{c} 10^{(10\log_{10}(M_{PUSCH,c}(i)) + P_{O\_PUSCHc}(j) + \alpha_c(j) \cdot PL_c + \Delta_{TF,c}(i) + f_c(i))/10} + \\ 10^{(P_{0\_PUCCH} + PL_c + h(n_{CQI}, n_{HARQ}, n_{SR}) + \Delta_{F\_PUCCH}(F) + \Delta_{TxD}(F') + g(i))/10} \end{array} \right)$$
[dB]

[Formula 4]
$$PH_{type2}(i) = P_{CMAX,c}(i) - 10\log_{10}$$
$$\left( \begin{array}{c} 10^{(10\log_{10}(M_{PUSCH,c}(i)) + P_{O\_PUSCHc}(j) + \alpha_c(j) \cdot PL_c + \Delta_{TF,c}(i) + f_c(i))/10} + \\ 10^{(P_{0\_PUCCH} + PL_c + g(i))/10} \end{array} \right)$$
[dB]

[Formula 5]
$$PH_{type2}(i) = P_{CMAX,c}(i) - 10\log_{10}$$
$$\left( \begin{array}{c} 10^{(P_{O\_PUSCH,c}(1) + \alpha_c(1) \cdot PL_c + f_c(i))/10} + \\ 10^{(P_{0\_PUCCH} + PL_c + h(n_{CQI}, n_{HARQ}, n_{SR}) + \Delta_{F\_PUCCH}(F) + \Delta_{TxD}(F') + g(i))/10} \end{array} \right)$$
[dB]

[Formula 6]
$$PH_{type2}(i) = P_{CMAX,c}(i) - 10\log_{10}$$
$$\left( \begin{array}{c} 10^{(P_{O\_PUSCH,c}(1) + \alpha_c(1) \cdot PL_c + f_c(i))/10} + \\ 10^{(P_{0\_PUCCH} + PL_c + g(i))/10} \end{array} \right)$$
[dB]

In Formula 4 to Formula 6, $P_{O\_PUCCH}$ is a parameter constructed with a sum of $P_{O\_NOMINAL\_PUCCH}$, which is a nominal component provided by a higher layer, and $P_{O\_UE\_PUCCH}$, which is a UE-specific component provided by the higher layer, and is a value notified to a user equipment by a base station.

$\Delta_{F\_PUCCH}(F)$ and $\Delta_{TxD}(F)$ are the values provided by the higher layer and $g_c(i)$ is a value indicating a current PUCCH power control adjusted state.

Referring to Formulas 1 to 6, a user equipment calculates a power headroom for each of at least one activated serving cell using a maximum transmission power $P_{CMAX,c}$ of the user equipment for each of the at least one activated serving cell. Yet, the maximum transmission power of the user equipment for each of the at least one activated serving cell is the value selected in a predetermined range by the user equipment. A base station is unable to know a value of the maximum transmission power unless the user equipment notifies the maximum transmission power to the base station.

Referring now to FIG. 6, the user equipment transmits a power headroom report, which contains the maximum transmission power of the user equipment for each of the at least one activated serving cell and a power headroom for each of the at least one activated serving cell, to the base station [S620].

As mentioned in the foregoing description, the base station is not aware of the maximum transmission power of the user equipment for each of the at least one serving cell and the maximum transmission powers of the user equipment for the at least one or more serving cells can differ from each other. Therefore, the base station has difficulty in estimating a total power level of the user equipment with the power headroom for each of the at least one or more serving cells.

Therefore, according to an embodiment of the present invention, a user equipment informs a base station of a maximum transmission power of the user equipment for each of at least one serving cell. In particular, the user equipment is able to transmit the maximum transmission power of the user equipment for each of the at least one serving cell using such a higher layer signaling as RRC signaling and the like or a physical channel. The maximum transmission power of the user equipment for each of the at least one service cell is represented as a linear value or can be represented in a manner of reusing the previous PHR information configuration.

The user equipment is able to transit the maximum transmission power of the user equipment for each of the at least one service cell via a power headroom report together with a power headroom for each of the at least one serving cell activated when a headroom report triggering takes place. Alternatively, the user equipment is able to transmit the maximum transmission power of the user equipment for each of the at least one service cell each time the maximum transmission power of the user equipment is changed.

Figure 7:
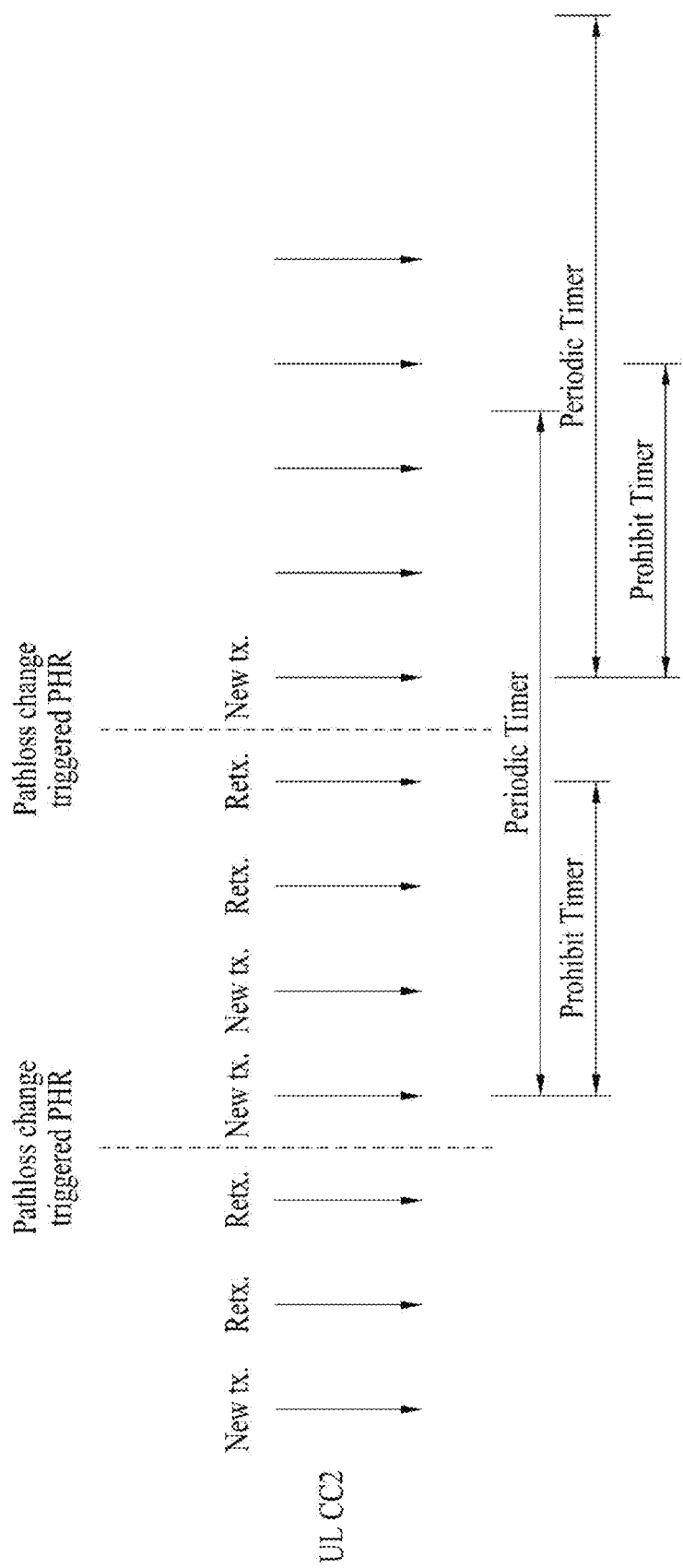
FIG. 7 is a diagram for a transmission timing point of a power headroom report.

FIG. 7 is a diagram for a transmission timing point of a power headroom report.

Referring to FIG. 7, a user equipment is able to generate a power headroom report using a predetermined value (dl-PathlossChange) by dB unit for a periodic power headroom reporting timer (periodicPHR-Timer), a prohibit power headroom reporting timer (prohibitPHR-Timer) and a DL path loss change level. In particular, the user equipment is able to generate a power headroom report each time the periodic power headroom reporting timer expires. If the prohibit power headroom reporting timer expires and a pathloss is changed over the predetermined value (dl-PathlossChange), the user equipment is able to generate a power headroom report.

The power headroom reporting timer, the prohibit power headroom reporting timer and the predetermined value (dl-PathlossChange) can be transmitted to the user equipment by the base station via RRC (radio resource control) message.

After the user equipment has generated the power headroom report, if there is a UL resource allocated for a new transmission, the user equipment generates a power headroom report (PHR) control element based on a power headroom value obtained from a physical layer, transmits the power headroom report control element, and then restarts the periodic power headroom reporting timer and the prohibit power headroom reporting timer.

In FIG. 7, after the user equipment has performed the new transmission, the user equipment starts the periodic power headroom reporting timer and the prohibit power headroom timer. After the prohibit power headroom reporting timer has expired and the pathloss change has been changed over the predetermined value, the user equipment transmits the power headroom report in performing a new transmission. And, the user equipment restarts the periodic power headroom reporting timer and the prohibit power headroom reporting timer.

The higher layer of the user equipment obtains a first type power headroom for each of the activated service cells and a maximum transmission power of the user equipment for each of the activated service cells from a physical layer. In case of transmitting PUCCH and PUSCH simultaneously, the user equipment obtains a second type power headroom for a primary cell and a maximum transmission power of the user equipment for a second type power headroom.

Subsequently, the user equipment generates a PHR MAC control element based on the values reported from the physical layer and then transmits the generated PHR MAC control element.

FIG. 8 is a diagram for one example of PHR MAC control element. FIG. 8(a) shows a PHR MAC control element in case of transmitting a first type power headroom for a primary cell only. FIG. 8(b) shows a PHR MAC control element in case of transmitting a first type power headroom and a second type power headroom for a primary cell.

Referring to FIG. 8, a field $C_i$ indicates an activated state of a secondary cell having a cell index set to 'i'. In particular, if the field $C_i$ is set to 1, a power headroom of the secondary cell having the cell index 'i' is reported. If the field $C_i$ is set to 0, a power headroom of the secondary cell having the cell index 'i' is not reported.

'R' indicates a reserved bit and is set to 0.

'V' indicates whether a power headroom is a value based on a real transmission. In particular, if the V is set to 0 for a first type power headroom, it means that the real transmission is accomplished via PUSCH. On the contrary, if the V is set to 1 for a second type power headroom, it means that the real transmission is accomplished via PUCCH.

A filed PH indicates a power headroom and includes 6 bits. And, $P_{CMAX,c}$ indicates a maximum transmission power of a user equipment for a service cell c used in calculating the power headroom indicated by the field PH.

Referring to FIG. 8, a maximum transmission power of a user equipment for a primary cell follows a power headroom for the primary cell. And, power headrooms and maximum transmission powers for secondary cells can appear in ascending order.

FIG. 9 is a diagram for another example of PHR MAC control element.

FIG. 9(a) shows a method of multi-carrier extension by reusing PHR information configuration of Rel 8/9.

Referring to FIG. 9(a), an information configuration includes 6 bits. PHR MAC control element includes a first type power headroom, a second type power headroom and a maximum transmission power of a user equipment for a primary cell and also includes a second type power headroom and a maximum transmission power of a user equipment for a secondary cell. In FIG. 9(a), the R indicates a reserved it. When a power headroom (PH) is allocated t one MAC CE in order implicitly determined, an indication of a cell may be unnecessary. Occasionally, the reserved bit is used as an identifier filed for a cell or an identifier for a type or species of the power headroom (PH). For instance, '00' indicates a first type power headroom, '01' indicates a second type power headroom, and '10' indicates a maximum transmission power.

FIG. 9(b) shows a method of configuring a maximum power of a user equipment after configuring a preferential power headroom information in a modified form. Information on order can be configured implicitly or explicitly.

FIG. 10 is a diagram for further example of PHR MAC control element. In particular, FIG. 10 shows a format of a MAC control element for transmitting a maximum transmission power of a user equipment for each activated serving cell.

FIG. 10(a) shows a case of transmitting maximum transmission power of a user equipment for a plurality of activated serving cells. In this case, information on order can be configured implicitly or explicitly. MAC CE shown in FIG. 10(a) can be transmitted together with a power headroom report when the power headroom report is triggered. And, the MAC CE can be transmitted when maximum transmission power of the user equipment for a plurality of the activated cells is changed. If the MAC CE shown in FIG. 10(a) is separately transmitted, it is able to reduce an overhead.

FIG. 10(b) or FIG. 10(c) shows a case of generating a maximum transmission power of a user equipment for each of a plurality of activated serving cells into a separate MAC CE. Referring to FIG. 10(b) and FIG. 10(c), MAC CE includes a cell index and maximum transmission power.

FIG. 10(c) shows that a maximum transmission power field is changed into 5 bits. It is highly probable that the a maximum transmission power is not set to a level equal to or lower than 0 dBm despite considering MPR, A-MPR and the like. Although 0~23 dBm (or up to 25 dBm) or 1 dB step is taken into consideration, it is able to express the maximum transmission power with 2 levels. Hence, since 5 bits can express 32 levels, 5 bits are enough to express the maximum transmission power. Of course, the maximum transmission power is set to 6 bits and a cell index can be set to 2 bits.

In addition, another method is proposed as well as a method for a user equipment to inform a base station of a maximum transmission power of the user equipment for each of at least one activated serving cell is proposed as follows.

First of all, a user equipment is able to transmit a power headroom of the user equipment together with a power headroom for each of at least one activated serving cell. In this case, the power headroom of the user equipment is a value resulting from subtracting a sum of transmission powers of all scheduled serving cells from a maximum power of the user equipment. In this case, it is able to send the power headroom of the user equipment by substituting a previous second type power headroom. In particular, when a first type power headroom and a second type power headroom are transmitted, it is able to transmit the power headroom of the user equipment instead of the second type power headroom.

A user equipment is able to transmit a value, of which a base station is not aware, corresponding to either an MPR value or a value for determining a maximum transmission power of the user equipment for each of at least one serving cell to the base station. In transmitting the MPR from the user equipment to the base station, the user equipment is able to transmit the MPR if the MPR is changed in accordance with a modulation order or a change of a size of an allocated resource block. Alternatively, a value, of which a base station is not aware, corresponding to either an MPR value or a value for determining a maximum transmission power of the user equipment for each of at least one serving cell can be set to a fixed value known to both of the base station and the user equipment.

A user equipment sets a maximum transmission power of the user equipment for each of at least one activated serving cell to one fixed value to use. In doing so, the user equipment is able to select the maximum transmission power of the user equipment for each of the at least one activated serving cell within upper and lower limit ranged in consideration of MPR, A-MPR and the like. For instance, the user equipment is able to calculate the maximum transmission power of the user equipment for each of the at least one activated serving cell on the assumption that MPR is a maximum value of the MPR.

Referring now to FIG. 6, the base station allocates the resource determined in accordance with the information contained in the power headroom report to the user equipment [S630].

Figure 11:
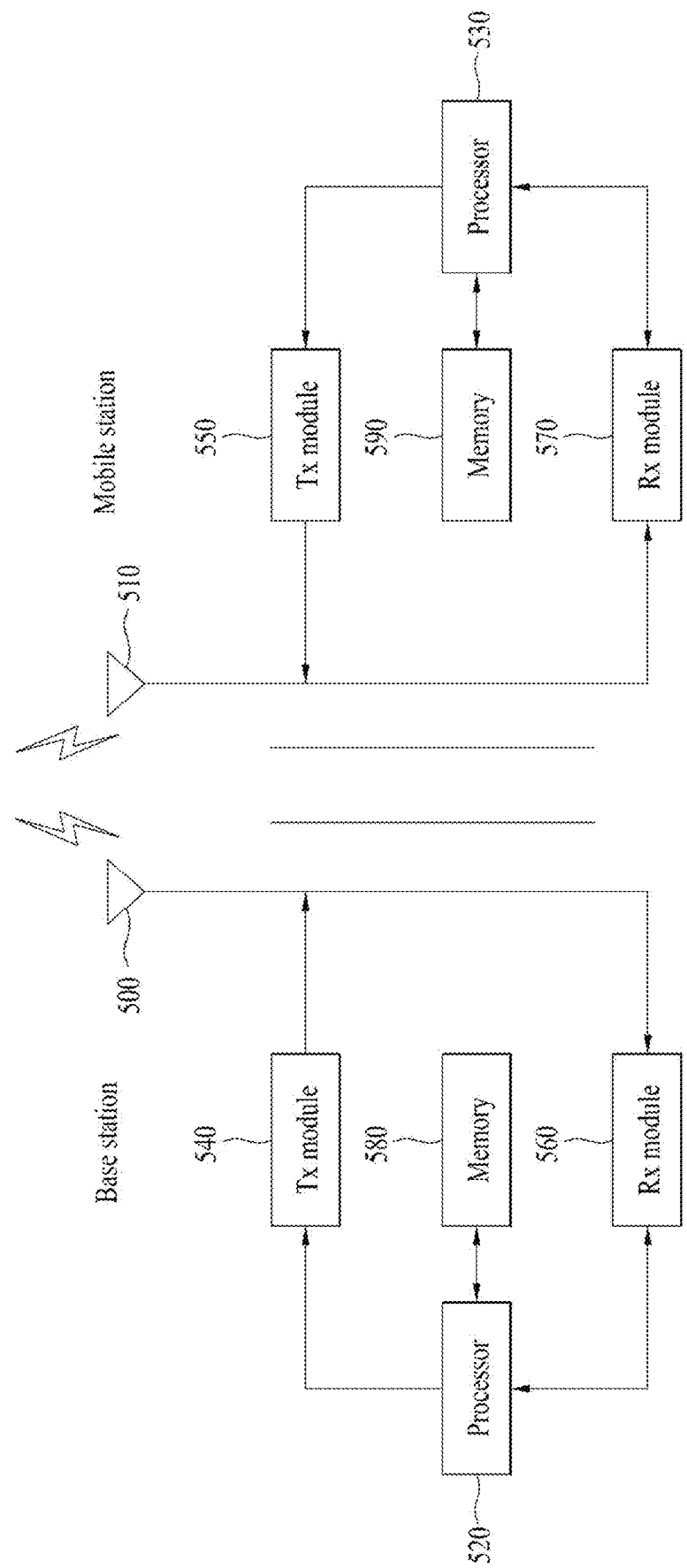
FIG. 11 is a block diagram for configurations of mobile and base stations, in which embodiments of the present invention are implemented, according to the present invention.

FIG. 11 is a block diagram for configurations of mobile and base stations, in which embodiments of the present invention are implemented, according to the present invention.

Referring to FIG. 11, a mobile station (AMS)/base station (ABS) includes an antenna 500/510 capable of transmitting and receiving information, data, signals and/or messages and the like, a transmitting module (Tx module) 540/550 transmitting a message by controlling the antenna, a receiving module (Rx module) 560/570 receiving a message by controlling the antenna, a memory 580/590 storing informations associated with communication with a base station, and a processor 520/530 controlling the transmitting module, the receiving module and the memory. In this case, the base station can include a femto base station or a macro base station.

The antenna 500/510 externally transmits a signal generated from the transmitting module 540/550. And, the antenna 500/510 receives a radio signal from outside and then delivers the received radio signal to the receiving module 560/570. In case that a multiple-antenna (MIMO) function is supported, at least two antennas can be provided to the mobile station or the base station.

The processor 520/530 generally controls overall operations of the mobile/base station. In particular, the processor 520/530 is able to perform a control function for performing the above-described embodiments of the present invention, a MAC (medium access control) frame variable control function according to service characteristics and propagation configuration, a handover function, an authentication function, an encryption function and the like. And, the processor 520/530 can further include an encryption module configured to encrypt various messages and a timer module configured to control transmission and reception of the various messages.

The processor 530 of the user equipment calculates a power headroom for each of at least one or more activated serving cells using a maximum transmission power of the user equipment for each of the at least one or more activated serving cells.

The transmitting module 540/550 performs prescribed coding and modulation on a signal and/or data, which is scheduled by the processor and will be then transmitted externally, and is then able to deliver the coded and modulated signal and/or data to the antenna 500/510.

The transmitting module 550 of the user equipment transmits a power headroom report, which includes a power headroom for each of the at least one or more activated serving cells and a maximum transmission power of the user equipment for each of the at least one or more activated serving cells, to the base station.

The receiving module 560/570 reconstructs the radio signal received externally via the antenna 500/510 into original data in a manner of performing decoding and demodulation on the received radio signal and is then able to deliver the reconstructed original data to the processor 520/530.

The memory 580/590 can store programs for processing and control of the processor and is able to perform a function of temporarily storing input/output data (e.g., in case of the mobile station, UL grant allocated by the base station, system information, station identifier (STID), a flow identifier (FID), an action time, region allocation information, frame offset information, etc.).

And, the memory 580/590 can include at least one of storage media including a flash memory, a hard disk, a multimedia card micro type memory, a memory card type memory (e.g., SD memory, XD memory, etc.), a RAM (random access memory), an SRAM (static random access memory), a ROM (read-only memory), an EEPROM (electrically erasable programmable read-only memory), a PROM (programmable read-only memory), a magnetic memory, a magnetic disk, an optical disk and the like.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. For instance, the respective configurations disclosed in the aforesaid embodiments of the present invention can be used by those skilled in the art in a manner of being combined with one another.

Therefore, the present invention is non-limited by the embodiments disclosed herein but intends to give a broadest scope matching the principles and new features disclosed herein.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of transmitting a power headroom report by a user equipment (UE) in a wireless communication system supporting carrier aggregation, the method comprising:
    obtaining, by the UE, a power headroom for a first cell based on a maximum transmission power for the first cell;
    obtaining, by the UE, a power headroom for a second cell based on a maximum transmission power for the second cell; and
    transmitting, by the UE, the power headroom report to a base station, the power headroom report including:
        the power headroom for the first cell;
        the maximum transmission power for the first cell;
        the power headroom for the second cell; and
        the maximum transmission power for the second cell,
        wherein the power headroom report includes a first two consecutive bytes including:
            six bits of a preceding byte of the first two consecutive bytes indicating the power headroom for the first cell, and
            six bits of a subsequent byte of the first two consecutive bytes indicating the maximum transmission power for the first cell, and
        wherein the power headroom report further includes a second two consecutive bytes including:
            six bits of a preceding byte of the second two consecutive bytes indicating the power headroom for the second cell, and six bits of a subsequent byte of the second two consecutive bytes indicating the maximum transmission power for the second cell.

2. The method of claim 1, wherein each of the power headroom for the first cell and the power headroom for the second cell is obtained based on a physical uplink shared channel (PUSCH) power.

3. The method of claim 1, wherein the power headroom report is transmitted via a medium access control (MAC) message.

4. A method of receiving a power headroom report by a base station (BS) in a wireless communication system supporting carrier aggregation, the method comprising:
receiving, by the BS, the power headroom report from a user equipment, the power headroom report including:
a power headroom for a first cell;
a maximum transmission power for the first cell;
a power headroom for a second cell; and
a maximum transmission power for the second cell; and
allocating, by the BS, a resource to the user equipment based on the power headrooms and the maximum transmission powers included in the power headroom report,
wherein the power headroom for the first cell is obtained based on the maximum transmission power for the first cell,
wherein the power headroom for the second cell is obtained based on the maximum transmission power for the second cell,
wherein the power headroom report includes a first two consecutive bytes including:
six bits of a preceding byte of the first two consecutive bytes indicating the power headroom for the first cell, and
six bits of a subsequent byte of the first two consecutive bytes indicating the maximum transmission power for the first cell, and
wherein the power headroom report further includes a second two consecutive bytes including:
six bits of a preceding byte of the second two consecutive bytes indicating the power headroom for the second cell, and
six bits of a subsequent byte of the second two consecutive bytes indicating the maximum transmission power for the second cell.

5. The method of claim 4, wherein each of the power headroom for the first cell and the power headroom for the second cell is obtained based on a physical uplink shared channel (PUSCH) power.

6. The method of claim 4, wherein the power headroom report is transmitted via a medium access control (MAC) message.

7. A user equipment (UE) configured to transmit a power headroom report in a wireless communication system supporting carrier aggregation, the UE comprising:
a transceiver; and
a processor operatively coupled to the transceiver, the processor being configured to:
obtain a power headroom for a first cell based on a maximum transmission power for the first cell;
obtain a power headroom for a second cell based on a maximum transmission power for the second cell; and
control the transceiver to transmit the power headroom report to a base station, the power headroom report including:
the power headroom for the first cell;
the maximum transmission power for the first cell;
the power headroom for the second cell; and
the maximum transmission power for the second cell,
wherein the power headroom report includes a first two consecutive bytes including:
six bits of a preceding byte of the first two consecutive bytes indicating the power headroom for the first cell, and
six bits of a subsequent byte of the first two consecutive bytes indicating the maximum transmission power for the first cell, and
wherein the power headroom report further includes a second two consecutive bytes including:
six bits of a preceding byte of the second two consecutive bytes indicating the power headroom for the second cell, and
six bits of a subsequent byte of the second two consecutive bytes indicating the maximum transmission power for the second cell.

8. The user equipment of claim 7, wherein each of the power headroom for the first cell and the power headroom for the second cell is obtained based on a physical uplink shared channel (PUSCH) power.

9. A base station (BS) configured to receive a power headroom report in a wireless communication system supporting carrier aggregation, the BS comprising:
a transceiver; and
a processor operatively connected to the transceiver, the processor being configured to:
control the transceiver to receive the power headroom report from a user equipment, the power headroom report including:
a power headroom for a first cell;
a maximum transmission power for the first cell;
a power headroom for a second cell; and
a maximum transmission power for the second cell; and
allocate a resource to the user equipment based on the power headrooms and the maximum transmission powers included in the power headroom report,
wherein the power headroom for the first cell obtained based on the maximum transmission power for the first cell,
wherein the power headroom for the second cell is obtained based on the maximum transmission power for the second cell,
wherein the power headroom report includes a first two consecutive bytes including:
six bits of a preceding byte of the first two consecutive bytes indicating the power headroom for the first cell, and
six bits of a subsequent byte of the first two consecutive bytes indicating the maximum transmission power for the first cell, and
wherein the power headroom report further includes a second two consecutive bytes including:
six bits of a preceding byte of the second two consecutive bytes indicating the power headroom for the second cell, and
six bits of a subsequent byte of the second two consecutive bytes indicating the maximum transmission power for the second cell.

10. The base station of claim 9, wherein each of the power headroom for the first cell and the power headroom for the second cell is obtained based on a physical uplink shared channel (PUSCH) power.

11. The base station of claim 9, wherein the power headroom report is transmitted via a medium access control (MAC) message.

12. The base station of claim 9, wherein:
the first cell is a primary cell used for initial connection establishment or connection re-establishment; and
the second cell is a cell other than the primary cell.

13. The base station of claim 9, wherein a power headroom for a cell is obtained based on a difference between a maximum transmission power for the cell and a transmission power configured for the cell.

14. The method of claim 1, wherein:
the first cell is a primary cell used for initial connection establishment or connection re-establishment; and
the second cell is a cell other than the primary cell.

15. The method of claim 1, wherein a power headroom for a cell is obtained based on a difference between a maximum transmission power for the cell and a transmission power configured for the cell.

16. The method of claim 4, wherein:
the first cell is a primary cell used for initial connection establishment or connection re-establishment; and
the second cell is a cell other than the primary cell.

17. The method of claim 4, wherein a power headroom for a cell is obtained based on a difference between a maximum transmission power for the cell and a transmission power configured for the cell.

18. The UE of claim 7, wherein the power headroom report is transmitted via a medium access control (MAC) message.

19. The UE of claim 7, wherein:
the first cell is a primary cell used for initial connection establishment or connection re-establishment; and
the second cell is a cell other than the primary cell.

20. The UE of claim 7, wherein a power headroom for a cell is obtained based on a difference between a maximum transmission power for the cell and a transmission power configured for the cell.

* * * * *